Figure 1:
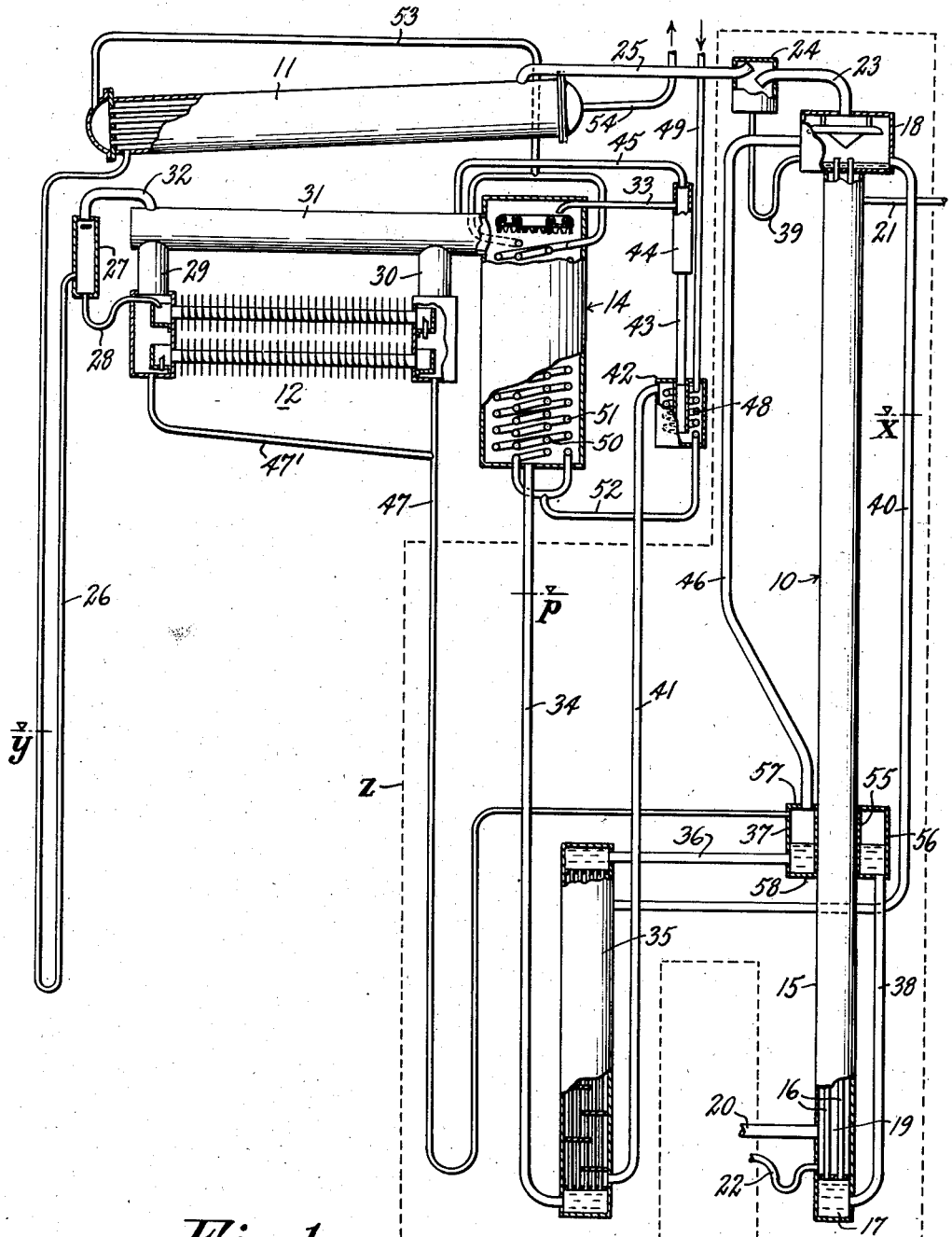

July 4, 1944.   A. R. THOMAS   2,352,814
REFRIGERATION
Filed July 26, 1940   2 Sheets-Sheet 2

INVENTOR.
Albert R. Thomas
BY
his ATTORNEY.

Patented July 4, 1944

2,352,814

UNITED STATES PATENT OFFICE 2,352,814

REFRIGERATION

Albert R. Thomas, Evansville, Ind., assignor to Servel, Inc., New York, N. Y., a corporation of Delaware Application July 26, 1940, Serial No. 347,631

15 Claims. (Cl. 62—119)

This invention relates to refrigeration, and more particularly to refrigeration systems of the absorption type.

In refrigeration systems of this type absorption solution enriched in refrigerant flows from an absorber to a generator and refrigerant is expelled out of solution in the latter by heating. When the temperature differential between the absorption solution in the generator and the solution introduced into the generator is relatively high, and the entering solution is at a temperature considerably below the boiling temperature of the solution in the generator, a relatively great part of the heat input is always being utilized to supply heat of liquid to the generator solution. With a part of the heat input always being utilized to bring up the average temperature of the absorption solution in the generator to its boiling point, only the remaining part of the heat supply is available for heat of vaporization to effect expulsion of refrigerant vapor from solution. The rate at which refrigerant vapor is expelled from solution in the generator is, therefore, directly related to the temperature differential between such solution and the absorption solution entering the generator, the rate of refrigerant expulsion becoming smaller with increase in the temperature differential.

Further, in generators in which liquid is raised by gas or vapor-lift action other conditions exist when the enriched absorption solution entering the generator is at a temperature considerably below that of the solution in the generator. This is particularly true in generators having one or more riser tubes in which absorption solution is carried up as an annulus with expelled refrigerant vapor in the center. The expelled refrigerant vapors rises more rapidly than the absorption solution with the latter following the inside walls of the riser tubes. Due to the temperature differential between enriched solution entering the generator and the solution in the latter, objectionable noises are often produced in generators of the type just mentioned which is referred to as condensate knocking, and objectionable superheating may take place to disturb the normal steady flow of absortion solution.

It is an object of this invention, therefore, to provide an improvement in refrigeration systems of the type described whereby substantially all of the heat input to the generator is effectively utilized for heat of vaporization to effect expulsion of refrigerant from absorption solution. With this arrangement the absorption solution in the generator is maintained substantially at its boiling temperature, and the part of the heat input utilized to supply heat of liquid to the solution is relatively small. I accomplish this by preheating the absorption solution in its path of flow from the absorber to the generator. The absorption solution flowing to the generator is preheated to a relatively high temperature and preferably to a temperature substantially close to the boiling temperature of absorption solution in the generator. With such an arrangement, practically all of the heat input to the generator is utilized to cause expulsion of refrigerant vapor from solution at its boiling point, and this is a distinct advantage in systems in which liquid is raised by gas or vapor lift action, because proper lifting of liquid is effected to insure a sufficiently rapid rate of flow of absorption solution under all operating conditions varying between low and high loads.

The preheating of enriched absorption solution prior to entering the generator is effected by heat derived from a source external to the refrigeration system. The preheating of enriched absorption solution is preferably accomplished in a liquid downflow conduit which is connected at its lower end to a liquid upflow conduit of the generator, so that the overall height of the generator will be kept at a minimum. This is particularly advantageous when the liquid upflow conduit of the generator serves as a vapor or gas lift member for lifting liquid and when such member is of considerable height, as is the case, for example, in refrigeration systems of large capacity.

The invention, together with the above and other objects and advantages thereof, will be better understood from the following description taken in conjunction with the accompanying drawings forming a part of this specification, and of which:

Fig. 1 is a view more or less diagrammatically illustrating a refrigeration system embodying the invention; and Figs. 2 to 5 inclusive are fragmentary views illustrating other embodiments of the invention.

Referring to Fig. 1, I have shown the present improvement embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator or expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. Briefly, the generator 10 includes an outer shell 15 within which are disposed a plurality of vertical riser tubes 16 having the lower ends thereof communicating with a space 17 and the upper ends thereof extending into a vessel 18. The space 19 within shell 15 and about the tubes 16 forms a steam chamber to which steam is applied through a conduit 20. The space 19 provides for full length heating of riser tubes 16, and a vent 21 is provided at the upper end of shell 15. A trap conduit 22 is connected to the lower end of shell 15 above space 17 to provide a drain for condensate formed in space 19.

The system operates at a partial vacuum and contains a solution of refrigerant in absorption liquid such as, for example, a water solution of 40% lithium chloride by weight. With steam being supplied through conduit 20 to space 19 at atmospheric pressure, heat is applied to tubes 16 whereby water vapor is expelled from solution. The absorption solution is raised by vapor lift action with the expelled water vapor forming a central core about an upwardly rising annulus of the solution. The expelled water vapor rises more rapidly than the solution and the latter follows the inside walls of tubes 16. The water vapor flows upward through the tubes 16, vessel 18, conduit 23, vapor separating chamber 24, and conduit 25 into condenser 11 in which it is liquefied. The condensate formed in condenser 11 flows therefrom through a U tube 26, flash chamber 27 and conduit 28 into evaporator 12.

The water supplied to evaporator 12 evaporates therein to produce a refrigerating or cooling effect with consequent absorption of heat from the surroundings, as from a stream of air flowing over the exterior surfaces of the evaporator. The vapor formed in evaporator 12 passes through tubes 29 and 30 into a manifold 31 which is connected to absorber 14. To prevent disturbances in evaporator 12, the flash chamber 27 is provided to take care of any vapor flashing of liquid being fed to the evaporator through U tube 26. The flashed vapor formed in the initial cooling of the liquid flowing from the condenser passes through conduit 32 to manifold 31 and mixes with the vapor formed in evaporator 12.

In absorber 14 refrigerant vapor is absorbed into concentrated absorption solution which enters through a conduit 33. The water vapor absorbed into solution dilutes the latter, and the diluted absorption solution enriched in refrigerant flows through a conduit 34, a first passage in liquid heat exchanger 35, a conduit 36, vessel 37, and conduit 38 into the lower space 17 of generator 10. Water vapor is expelled out of solution in generator 10 by heating and the solution is raised by vapor lift action in vertical tubes 16, as explained above. Any liquid separated from vapor in separating chamber 24 flows through a U trap 39 back to vessel 18.

The absorption solution in vessel 18 is concentrated since water vapor has been expelled therefrom in generator 10. This concentrated solution flows through a conduit 40, a second passage in liquid heat exchanger 35, conduit 41, a precipitation vessel 42, conduit 43, vessel 44 and conduit 33 into absorber 14. This circulation of absorption solution results from the raising of liquid by vapor lift action in vertical riser tubes 16, whereby the solution can flow to the absorber 14 and return from the latter to the generator 10 by force of gravity.

To provide a vent for vessel 44, the upper end thereof is connected by a conduit 45 to manifold 31. The upper end of vessel 37 is connected by a conduit 46 to vessel 18, whereby the pressure in vessel 37 is equalized with the pressure in the upper end of generator 10 and condenser 11. The lower parts of evaporator 12 are connected by conduits 47 and 47' to an upper part of vessel 37, so that excess liquid may be drained from evaporator 12 into vessel 37.

The precipitation vessel 42 is provided with a coil 48 to which a cooling medium, such as, for example, water, is supplied through a conduit 49. The heat liberated with absorption of water vapor in absorber 14 is transferred to a cooling medium which flows upward through coils 50 and 51. The coil 48 may be connected by a conduit 52 to the coils 50 and 51 and the latter may be connected by a conduit 53 to condenser 11, so that the same cooling medium may be utilized to cool precipitation vessel 42, absorber 14 and condenser 11. The cooling medium may flow from condenser 11 through conduit 54 to waste.

The system operates at a low pressure with the generator 10 and condenser 11 operating at one pressure and the evaporator 12 and absorber 14 operating at a lower pressure, the pressure differential being maintained by liquid columns. Thus, the liquid column formed in the tube 26 maintains the pressure differential between condenser 11 and evaporator 12, the liquid column in conduit 34 maintains the pressure differential between the outlet of absorber 14 and generator 10, and the liquid column formed in conduit 41 and parts connected thereto maintains the pressure differential between the inlet to absorber 14 and the upper part of generator 10. The liquid column formed in conduit 47 maintains the pressure differential between evaporator 12 and the upper part of vessel 37 which is pressure-equalized with the upper part of generator 10 by pressure equalizing conduit 46. In operation, the liquid columns may form in conduits 40 and 41 and down-leg of tube 26 to the levels $x$, $p$, and $y$, for example. The conduits are of such size that restriction to gas flow is effected without appreciably restricting flow of liquid. The liquid column formed in vessel 37 and conduit 38 provides the liquid reaction head for raising liquid in the vertical tubes 16 by vapor lift action.

The vessel 37 is of sufficient volume to hold the liquid differential in the system and is of such cross-sectional area that the liquid level therein does not appreciably vary, so that a substantially constant reaction head is provided for lifting liquid in generator 10. The vessel 37 is located below absorber 14 such a distance that, for the greatest pressure differential occurring between absorber 14 and the upper part or vapor space of generator 10 during operation of the system, the liquid column formed in conduit 34 is below the lower end of absorber 14. The generator 10, liquid heat exchanger 35 and connecting conduits are preferably embedded in suitable insulation retained in a jacket which is diagrammatically indicated by the broken line $z$ in Fig. 1.

In a generator of an absorption refrigeration system like that just described, condensate knocking often occurs due to the temperature differential between solution in the generator and the absorption solution flowing into the generator from the absorber. In generator 10, for example, vapor bubbles, which are formed in the lower parts of riser tubes 16, may pass through liquid into regions which are sufficiently cool to cause the vapor bubbles to collapse and produce objectionable noises or condensate knocks. Thus, when relatively cool absorption enters the lower parts of riser tubes 16, the solution at the surfaces of the tubes is heated very rapidly and a bubble of vapor forms before the central part of the liquid column is appreciably heated. The vapor bubble moves from the surface toward the center of the tube where rapid condensation occurs in cooler solution.

Also, when the liquid in the lower parts of riser tubes 16 is heated above the boiling point and remains in a liquid state, the continued application of heat eventually causes a relatively large quantity of vapor to form practically instantaneously. The formation of a large quantity of vapor practically instantaneously in this manner causes an abnormally large amount of liquid to be raised momentarily by vapor-lift action, whereby the normal steady rate of flow of absorption liquid to the absorber is disturbed. This phenomenon is referred to as superheating and is due to lack of fluid in gas phase in the lower parts of riser tubes 16. Even when the absorption solution entering the lower part of generator 10 is at a temperature of 10° F. below the boiling point, periodic superheating and intermittent liquid lifting action in riser tubes 16 may result. In order to obtain maximum capacity from generator 10, an even and steady flow of liquid in riser tubes 16 is required. When periodic flow of liquid in riser tubes 16 takes place, the upper portions of the tubes become dry part of the time and all of the tube surfaces are not effective to expel refrigerant from solution during the dry periods.

Let us assume that the steady boiling or vapor expulsion action in generator 10 is interrupted by an inrush of relatively cool absorption solution. It should be pointed out here that the flow of absorption solution into the lower part of generator 10 is never absolutely steady, because of the rocking action of the l'quid column in conduit 38. However, liquid is lifted more or less continuously in riser tubes 16 when the boiling action is steady. Due to inrush of relatively cool absorption solution into generator 10, as assumed above, solid columns of liquid form in riser tubes 16 to the height of the reaction head or liquid level in vessel 37. Under such conditions vapor phase is absent in the liquid columns in tubes 16, and, as the liquid is heated, the temperature will overstep the boiling point before vapor forms. When vapor starts, the superheated condition in the riser tubes causes extremely rapid boiling with an accompanying liquid surge. The initial boiling removes a portion of the liquid in the columns and the liquid in the lower parts is then in a further superheated condition. After the heated liquid is removed the action is again stopped by an inrush of relatively cool absorption solution. Superheating differs from condensate knocking in that it does not give rise to noise but does cause inefficient operation of generator 10.

In accordance with this invention, in order to increase the part of the heat input to the generator which is available to supply heat of vaporization for expulsion of refrigerant vapor from solution, and to operate the refrigeration system without the occurrence of superheating and condensate knocking in generator 10, the dilute absorption liquid flowing from absorber 14 to generator 10 is preheated prior to entering the lower generator space 17 and riser tubes 16.

In Fig. 1 I accomplish this by arranging vessel 37 in thermal exchange relation with shell 15 of generator 10. The vessel 37 is formed by spaced annular-shaped vertical walls 55 and 56 and top and bottom walls 57 and 58. The lower end of pressure equalizing conduit 46 is connected to the top wall 57, and the upper end of conduit 38 is connected to the bottom wall 58. The inner wall 55 contacts the shell or jacket 15 of generator 10 and hence is in thermal exchange relation with the latter. The space 19 within shell 15 forms a steam chamber, as pointed out above, and the heating effect of the steam is transmitted through the shell wall and vertical wall 55 to absorption liquid in vessel 37.

By heating absorption liquid in vessel 37, the temperature of the liquid is raised and flows through conduit 38 into space 17 at a higher temperature than it otherwise would if preheating of liquid were not effected. Although absorption solution flowing to generator 10 from absorber 14 is heated to some extent in liquid heat exchanger 35, warm liquid flowing to absorber 14 and from which heat is transferred to cooler solution in the liquid heat exchanger constitutes a heating source within the system, and, even after the heat transfer effected in the liquid heat exchanger, the absorption solution flowing through conduit 36 is at a temperature considerably below the temperature of the absorption solution in generator 10.

The absorption solution flowing from absorber 14 to generator 10 is heated to a temperature substantially close to its boiling temperature, so that the temperature differential between the solution in the generator and the solution entering the generator through conduit 38 is at a minimum. With this arrangement all regions of the liquid columns formed in the lower parts of riser tubes 16 are at a sufficiently high temperature and substantially at boiling temperature, so that vapor bubbles formed therein and moving therethrough will not collapse but will continue to pass through the liquid body as vapor bubbles to form the central core about the upwardly rising annulus of the solution in riser tubes 16.

By increasing the temperature at which the solution enters the lower ends of riser tubes 16, the formation of vapor bubbles is also facilitated without the phenomenon of superheating taking place. Thus, at a particular region below the liquid level in riser tubes 16 the boiling temperature is dependent upon the vapor pressure at the liquid surface level and the pressure head of liquid above such region. By preheating the solution in the manner described, vapor bubbles readily form at the particular region and at all other regions at their boiling temperatures, whereby the solution will not remain in a liquid state above its boiling temperature due to lack of fluid in gas phase.

Figure 2:
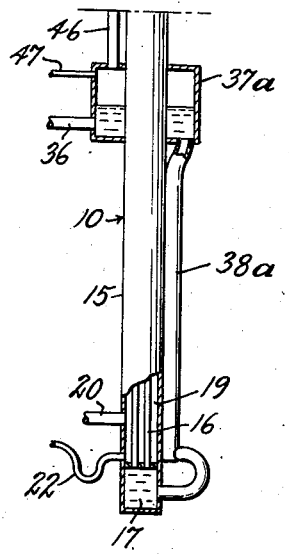

In Fig. 2 another embodiment of the invention is illustrated in which the vessel 37a forming the liquid leveling chamber is also arranged in thermal exchange relation with shell 15 of generator

10. In this embodiment a portion of the shell 15 forms the inner vertical wall of vessel 37a, so that the heating effect of the steam in space 19 is transmitted to liquid in vessel 37a through a heat conductive path formed only by the wall of shell 15. In addition, a conduit 38a similar to conduit 38 in Fig. 1 is arranged in thermal exchange relation with shell 15, so that continued preheating of absorption solution is effected while flowing through such conduit into the lower part of generator 10.

Figure 3:
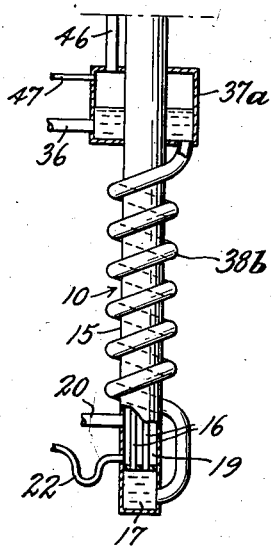

In Fig. 3 a further embodiment of the invention is illustrated in which the conduit 38b through which absorption solution flows from vessel 37a into the lower part of generator 10 is in the form of a helical pipe coil. The pipe coil is arranged in thermal exchange relation with shell 15 so that heating effect is transmitted from the steam space 19 to solution flowing in conduit 38b as well as to solution in vessel 37a.

Figure 4:
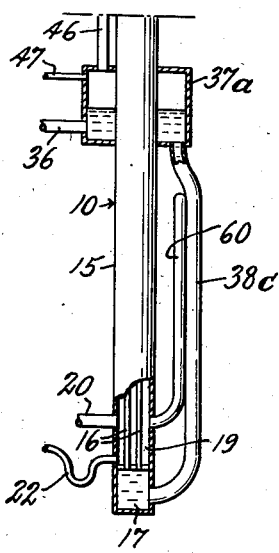

In Fig. 4 a still further embodiment of the invention is illustrated in which conduit 38c is spaced from shell 15 in the same manner as shown in Fig. 1. In Fig. 4, however, the shell 15 is provided with a branch steam conduit or pipe 60 which is connected at its lower end to shell 15 at the region of steam supply conduit 20. The upper end of the branch conduit or pipe 60 is closed to form a dead-end space which is always filled with steam. The branch steam pipe 60 is in thermal exchange relation with conduit 38c so that heating of absorption solution is effected not only in vessel 37a but also to solution flowing through conduit 38c prior to entering the lower part of generator 10.

Figure 5:
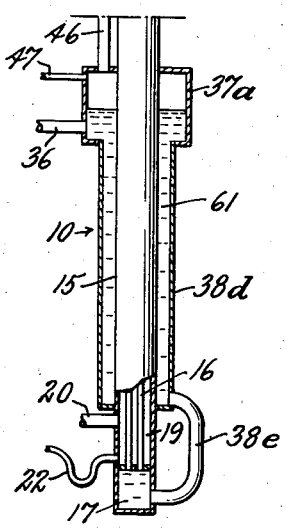

In Fig. 5 a still further embodiment of the invention is illustrated in which solution flows from vessel 37a through a passage 61 formed by shell 15 and a conduit 38d disposed about and spaced from the shell. The lower part of passage 61 is connected by a conduit 38e to the lower part of generator 10. Thus, heating of absorption solution is effected in vessel 37a and also in passage 61 through which the absorption solution flows after leaving vessel 37a and prior to entering the lower part of generator 10.

In all of the embodiments described and illustrated, the conduits through which absorption solution flows downwardly from vessel 37 or 37a to the lower part of generator 10 is sufficiently wide so that any vapor bubbles formed therein will freely pass through downwardly flowing liquid. The vapor bubbles will rise and pass into the space above the liquid surface level in vessel 37 or 37a which is in communication with the upper part of generator 10 through conduit 46.

It will be seen that in the embodiments illustrated the absorption solution conducted to the generator first passes through a liquid downflow conduit and then through a liquid upflow conduit or riser 16. The absorption solution is preheated in the liquid downflow conduit which is connected at its lower end to a lower part of the liquid upflow conduit. This preheating of absorption solution flowing to the generator is effected without increasing the height of the generator 10 and the overall dimensions of the refrigeration system. By arranging the downflow conduit in heat exchange relation with jacket 15, the same heating medium external to the system is employed to preheat the absorption solution prior to entering generator 10 as well as to heat the absorption solution in the generator. The arrangement of vessel 37 or 37a about generator 10 in the embodiments illustrated is distinctly advantageous in that a compact arrangement of parts is effected and at the same time an especially stable support is provided for the vessel.

While several embodiments of the invention have been shown and described, it will be apparent that modifications and changes may be made without departing from the spirit and scope of the invention, as pointed out in the following claims.

What is claimed is:

1. In absorption refrigeration apparatus, an absorber, a riser tube in which liquid is raised by vapor-lift action, such vapor-lift action being characterized by the liquid being carried up as an annulus along the inside wall of the tube by the more rapidly flowing vapor in the center of the annulus, a liquid heat exchanger, a first connection including one passage of said liquid heat exchanger for flowing liquid from the upper part of said tube to said absorber, a second connection for flowing liquid from said absorber to the lower part of said tube, a heating system constructed and arranged so that steam at a given temperature may be utilized to cause heating of said riser tube, and structure for preheating liquid flowing in said second connection, after passing through the second passage of said liquid heat exchanger and before entering the lower part of said tube, to raise said liquid substantially to said given temperature to prevent condensate knocking in said riser tube.

2. In an absorption refrigeration system of the kind operable below atmospheric pressure and utilizing as an absorbent a water solution from which water is expelled for use as a refrigerant, an absorber, a heat receiving part, a liquid heat exchanger, a first connection including one passage of said liquid heat exchanger for flowing solution from said heat receiving part to said absorber, a second connection including a second passage of said liquid heat exchanger for flowing solution from said absorber to said heat receiving part, a heating system for utilizing steam to cause heating of said heat receiving part, said heating system including a vent always unobstructed to atmosphere to control the heating of said heat receiving part by steam so that the upper temperature limit is substantially 212° F., and said second connection being constructed and arranged to receive heat from the steam in said heating system at a region between said heat exchanger and said heat receiving part to cause heating of solution flowing to said heat receiving part in such a manner that the heated solution introduced into said heat receiving part is substantially close to said upper temperature limit.

3. In absorption refrigeration apparatus, an absorber, an upflow member in which liquid is raised by vapor-lift action, a connection for flowing liquid from said absorber to the lower part of said member, a heating system for utilizing steam to cause heating of said member, said heating system including a vent to atmosphere provided to control the heating of said member by said steam so that the upper temperature limit is substantially 212° F., and said connection being constructed and arranged to receive heat from the steam in said heating system to cause heating of liquid flowing to said member in such a manner that the heated liquid introduced into said member is substantially close to said upper temperature limit.

4. In absorption refrigeration apparatus, an absorber, a generator, a riser tube associated with said generator in which liquid is raised by vapor-lift action, such vapor-lift action being characterized by the liquid being carried up as an annulus along the inside walls of the tube by the more rapidly flowing vapor in the center of the annulus, a connection for flowing liquid from said absorber to said generator, a heating system for utilizing steam to cause heating of said generator, said heating system including a vent unobstructed to atmosphere to control the heating of said generator by said steam so that the upper temperature limit is substantially 212° F., and said connection being constructed and arranged to receive heat from the steam in said heating system to cause heating of liquid flowing to said generator in such a manner that the heated liquid introduced into said generator is substantially close to said upper temperature limit to prevent knocking in said generator.

5. In absorption refrigeration apparatus comprising a plurality of parts including an absorber, a heat receiving part and a connection for flowing liquid from said absorber to said heat receiving part, a heating system for utilizing steam to cause heating of said heat receiving part, said connection being constructed and arranged to receive heat from the steam in said heating system to cause heating of liquid flowing to said heat receiving part in such a manner that the heated liquid introduced into said heat receiving part is substantially close to the temperature at which said receiving part is maintained by the said heat receiving system, and a vent connecting a region of said connection and another part of the apparatus to prevent trapping of any vapor formed in said connection resulting from heating of liquid flowing therethrough.

6. In an absorption refrigeration system of the kind operable below atmospheric pressure and utilizing as an absorbent a water solution from which water is expelled for use as a refrigerant, an absorber, a generator, one or more riser tubes associated with said generator, a connection for flowing absorption solution from said absorber to said generator, a heating system arranged to effect heating of said generator at a given constant temperature to cause expulsion of water vapor from absorption solution, substantially all of such vapor being utilized to raise solution in said riser tube or tubes by vapor-lift action, said connection being located and arranged to receive heat from said heating system at said given constant temperature to effect such heating of absorption solution flowing therethrough that solution is introduced into said generator substantially at the temperature at which the latter is maintained by said heating system, and the refrigeration apparatus embodying a vent connected to a part of said connection to prevent trapping of any vapor formed in said connection resulting from heating of solution flowing therethrough.

7. In absorption refrigeration apparatus, an absorber, a generator, a riser tube associated with said generator in which liquid is raised by vapor-lift action, a connection including a vessel for flowing liquid from said absorber to said generator, a portion of said connection including said vessel serving to hold a column of liquid to provide a reaction head for the raising of liquid by vapor-lift action in said riser tube, said vessel being at such an elevation above the lower end of said tube that the top of the liquid column forming said reaction head is within said vessel, a vapor connection between said vessel and an upper part of said riser tube, a heating system for utilizing steam to cause heating of said generator, and said vessel being constructed and arranged to receive heat from the steam in said heating system to preheat liquid flowing through said connection to said generator to raise such liquid substantially to the temperature to which the liquid in said generator is heated by the steam.

8. In an absorption refrigeration system of the kind operable below atmospheric pressure, an absorber, a vapor-lift member, the vapor-lift action effected in said member being characterized by the liquid being carried up as an annulus along the inside wall of the member by the more rapidly flowing vapor in the center of the annulus, a connection for conducting liquid from said absorber to said member, and a heating system for heating said member and also preheating liquid flowing to said member so that liquid entering said member is substantially at the temperature at which said member is maintained, thereby preventing condensate knocking and superheating in the lower part of said member and insuring normal lifting of liquid in said member.

9. In an absorption refrigeration system of the kind operable below atmospheric pressure and utilizing as an absorbent a water solution from which water is expelled for use as a refrigerant, said solution flowing from an absorber to a generator in which water vapor is expelled from solution in the latter by heating, the improvement which consists in conducting absorption solution from the absorber to the generator in a downward path of flow and then in an upward path of flow in the generator by vapor-lift action, heating said generator by steam to cause expulsion of water vapor from solution, utilizing substantially all of the expelled water vapor to effect upward flow of solution in the generator by vapor-lift action, and preheating absorption solution in the downward path of flow prior to entering the generator by heat derived from the steam utilized to cause flow of solution in the generator, so that the solution entering the generator is substantially at the temperature at which the solution in the generator is maintained by the steam.

10. In an absorption refrigeration system of the kind operable below atmospheric pressure and utilizing a water solution from which water is expelled for use as a refrigerant, an absorber, a generator having one or more riser tubes and in which substantially all of the vapor expelled from solution is utilized to raise solution by vapor-lift action, structure providing a heating space about said tube or tubes, a connection for flowing solution from said absorber to said generator including a liquid downflow conduit, means to supply a heating medium to the heating space for heating said tube or tubes, and said downflow conduit being constructed and arranged to receive heat from the heating medium in said space to effect preheating of solution flowing to said generator, such transfer of heat to the solution flowing to said generator being sufficient to prevent condensate knocking and superheating of solution in the lower part of said tube or tubes, so that normal lifting of solution in said tube or tubes will take place.

11. In an absorption refrigeration system of the kind operable below atmospheric pressure and utilizing a water solution from which water is expelled for use as a refrigerant, an absorber, a generator having one or more riser tubes in which solution is raised by vapor-lift action, structure providing a heating space about said tube or tubes, a connection for flowing solution from said absorber to said generator including a liquid downflow conduit, means to supply a heating medium to the heating space for heating said tube or tubes, said generator providing one or more places to which the bulk of the heat is transferred from said heating medium for heating solution to cause expulsion of refrigerant from solution and effect lifting of solution by vapor-lift action, and said downflow conduit being constructed and arranged to receive heat from the heating medium in said space to effect preheating of solution flowing from said absorber in said connection before such solution reaches said place or places in said generator, such transfer of heat to the solution flowing in said connection toward the generator being sufficient to prevent condensate knocking resulting from vapor bubbles collapsing in solution in the lower part of said tube or tubes and to avoid superheating of solution in the lower part of said tube or tubes.

12. In an absorption refrigeration system of the kind operable below atmospheric pressure and utilizing a water solution from which water is expelled for use as a refrigerant, an absorber, a generator having one or more riser tubes in which solution is raised by vapor-lift action, structure providing a heating space about said tube or tubes for a major portion of their length, a connection for flowing solution from said absorber to said generator including a liquid downflow conduit, means to supply a heating medium to the heating space for heating said tube or tubes, said downflow conduit being constructed and arranged to receive heat from the heating medium in said space to effect preheating of solution flowing to said generator, said transfer of heat to the solution flowing to the generator being sufficient to prevent condensate knocking resulting from vapor bubbles collapsing in the body of solution in the lower part of said tube or tubes and to avoid superheating of solution in the lower part of said tube or tubes.

13. In an absorption refrigeration system of the kind operable below atmospheric pressure and utilizing as an absorbent a water solution from which water is expelled for use as a refrigerant, a liquid upflow member in which solution is raised by vapor-lift action, structure providing a heating space about said member for more than a major portion of its length, means to supply a heating medium to said heating space for heating said upflow member, an annular-shaped vessel disposed about said structure, a conduit connecting a lower part of said vessel and a lower part of said upflow member, said vessel and conduit serving to hold a column of solution to provide a reaction head for the raising of solution by vapor-lift action in said member, said vessel being at such an elevation above the lower end of said member that the top of the solution column is within said vessel, a vapor connection between said vessel and an upper part of said member, an absorber, and a conduit for conducting solution from said absorber to said vessel.

14. In an absorption refrigeration system of the kind operable below atmospheric pressure and utilizing a water solution from which water is expelled for use as a refrigerant, a liquid upflow member in which solution is raised by vapor-lift action, structure providing a heating space about said member for a major portion of its length, a vessel, a conduit connecting the lower part of said vessel and a lower part of said member, said vessel and conduit serving to hold a column of solution to provide a reaction head for the raising of solution by vapor-lift action in said member, said vessel being constructed and arranged to receive heat from a heating medium in said space and at such an elevation above the lower end of said member that the top of the solution column is within said vessel, a vapor connection between said vessel and an upper part of said member, an absorber, a conduit for conducting solution from said absorber to said vessel, and means for supplying heating medium to the heating space for heating said member and said vessel, the solution in said vessel and flowing therefrom through said conduit to the lower part of said member being heated sufficiently to prevent condensate knocking resulting from vapor bubbles collapsing in solution in the lower part of said member and to avoid superheating of solution in the lower part of said member.

15. In a multi-pressure absorption refrigeration system of the kind operable below atmospheric pressure and utilizing as an absorbent a water solution from which water is expelled for use as a refrigerant, an absorber, a generator having one or more members for raising solution by vapor-lift action, a connection for conducting absorption solution from said absorber to said vapor-lift member or members, said connection including a first conduit portion to hold a column of solution to provide a reaction head for said vapor-lift member or members and a second conduit portion to hold a column of solution to balance a pressure differential in the system, and means for heating said generator and also heating said first conduit portion to effect preheating of solution flowing toward said generator, such heating of solution flowing toward said generator being sufficient to prevent condensate knocking resulting from vapor bubbles collapsing in solution in the lower part of said member or members and to avoid superheating of such solution.

ALBERT R. THOMAS.